US010476060B1

(12) United States Patent
Smith (10) Patent No.: US 10,476,060 B1
(45) Date of Patent: Nov. 12, 2019

(54) SEALED STRUCTURAL PASS THROUGH ASSEMBLIES FOR ELECTRIFIED VEHICLE BATTERY PACKS

(71) Applicant: FORD GLOBAL TECHNOLOGIES, LLC, Dearborn, MI (US)

(72) Inventor: Micah Smith, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/002,102

(22) Filed: Jun. 7, 2018

(51) Int. Cl.
| | | |
|---|---|---|
| *B60K 1/04* | (2019.01) | |
| *H01M 2/10* | (2006.01) | |
| *B60K 6/28* | (2007.10) | |
| *B62D 25/20* | (2006.01) | |

(52) U.S. Cl.
CPC ............ *H01M 2/1083* (2013.01); *B60K 1/04* (2013.01); *B60K 6/28* (2013.01); *B60K 2001/0438* (2013.01); *B60Y 2200/91* (2013.01); *B60Y 2200/92* (2013.01); *B62D 25/20* (2013.01); *H01M 2220/20* (2013.01); *Y10S 903/907* (2013.01)

(58) Field of Classification Search
CPC ................... H01M 2/1083; B60K 1/04; B60K 2001/0438; B60K 2001/0455; B60K 2001/0466; B60K 2001/0472; B62D 25/20
See application file for complete search history.

(56) References Cited

U.S. PATENT DOCUMENTS

| | | | |
|---|---|---|---|
| 5,002,243 A | 3/1991 | Kraus et al. | |
| 8,833,499 B2 | 9/2014 | Rawlinson | |
| 9,331,321 B2 | 5/2016 | Berger et al. | |
| 9,722,223 B1* | 8/2017 | Maguire | H01M 2/1083 |
| 10,207,573 B2* | 2/2019 | Hara | B60K 1/04 |
| 2010/0307848 A1 | 12/2010 | Hashimoto et al. | |
| 2012/0121959 A1* | 5/2012 | Yamada | B60K 1/04 429/100 |
| 2015/0151624 A1* | 6/2015 | Yamada | B60K 1/04 180/68.5 |
| 2015/0318525 A1 | 11/2015 | Maguire et al. | |
| 2016/0293914 A1* | 10/2016 | Miller | H01M 2/1083 |
| 2017/0232916 A1* | 8/2017 | McManaman | B60R 16/04 429/99 |
| 2018/0065573 A1* | 3/2018 | DeKeuster | B60R 16/0215 |
| 2018/0175351 A1* | 6/2018 | Kim | H01M 2/1083 |
| 2018/0201110 A1* | 7/2018 | Yin | B60K 1/04 |
| 2018/0236863 A1* | 8/2018 | Kawabe | B62D 25/025 |

* cited by examiner

*Primary Examiner* — Brian L Swenson
(74) *Attorney, Agent, or Firm* — Carlson, Gaskey & Olds (57) ABSTRACT

This disclosure details electrified vehicles that are equipped with pass through assemblies for structurally reinforcing and sealing battery packs. An exemplary pass through assembly includes clean-side component and a dirty-side component. The clean-side component is positioned primarily inside the battery pack, and the dirty-side component engages the clean-side component and extends to a location outside of the battery pack for interfacing with a component of the vehicle underbody. A seal of the pass through assembly is positioned between the clean-side component and the dirty-side component and is configured to block the ingress of water, dirt, and other potential contaminants.

20 Claims, 6 Drawing Sheets

SEALED STRUCTURAL PASS THROUGH ASSEMBLIES FOR ELECTRIFIED VEHICLE BATTERY PACKS

TECHNICAL FIELD

This disclosure relates to pass through assemblies for both structurally reinforcing and sealing electrified vehicle battery packs.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. The battery pack includes a plurality of energy storage devices, such as battery cells, that store energy for powering these electrical loads. The battery cells and various other battery components are typically packaged together inside an enclosure assembly. Depending on the mounting location relative to the vehicle, the battery pack may be susceptible to noise, vibration, and harshness and vehicle impact events.

SUMMARY

A pass through assembly for a battery pack according to an exemplary aspect of the present disclosure includes, among other things, a clean-side component including a pipe and a first flange protruding from the pipe, and a dirty-side component including a stud and a second flange protruding from the stud. The stud engages a portion of the pipe. A seal is arranged between the clean-side component and the dirty-side component.

In a further non-limiting embodiment of the foregoing pass through assembly, the pipe extends between a first end and a second end, and the first flange is located nearer to the first end.

In a further non-limiting embodiment of either of the foregoing pass through assemblies, the clean-side component includes a shoulder that extends above the first flange.

In a further non-limiting embodiment of any of the foregoing pass through assemblies, the second flange of the dirty-side component abuts against the shoulder.

In a further non-limiting embodiment of any of the foregoing pass through assemblies, the pipe includes a threaded passage, and a thread of the stud engages the threaded passage.

In a further non-limiting embodiment of any of the foregoing pass through assemblies, the stud includes a drive feature adapted for torquing the stud into the pipe.

In a further non-limiting embodiment of any of the foregoing pass through assemblies, the seal includes an annular body received within a groove formed in either a cover of the battery pack or the second flange.

In a further non-limiting embodiment of any of the foregoing pass through assemblies, the seal is established by an inverted flange that protrudes from a bottom face of the second flange.

In a further non-limiting embodiment of any of the foregoing pass through assemblies, the seal is embedded within the second flange and is either single sided for sealing against one structure or double sided for sealing against two structures.

In a further non-limiting embodiment of any of the foregoing pass through assemblies, a first section of the stud that extends below the second flange engages the portion of the pipe, and a nut is received over a second section of the stud that extends above the second flange.

An electrified vehicle according to another exemplary aspect of the present disclosure includes, among other things, a vehicle underbody including a floor pan, a battery pack mounted beneath the floor pan, and a pass through assembly including a clean-side component and a dirty-side component. The clean-side component extends from a location inside the battery pack and includes a portion at least partially exposed within a first hole formed in a cover of the battery pack. The dirty-side component is connected to the clean-side component and extends through a second hole formed in the floor pan.

In a further non-limiting embodiment of the foregoing electrified vehicle, a pipe of the clean-side component is secured to a battery internal structure by a weld bead.

In a further non-limiting embodiment of either of the foregoing electrified vehicles, the battery internal structure is a cross member positioned between a first battery array and a second battery array of the battery pack.

In a further non-limiting embodiment of any of the foregoing electrified vehicles, a flange of the clean-side component is received against an inner surface of the cover.

In a further non-limiting embodiment of any of the foregoing electrified vehicles, a shoulder of the clean-side component is the portion exposed within the first hole, and the shoulder abuts against a flange of the dirty-side component.

In a further non-limiting embodiment of any of the foregoing electrified vehicles, a flange of the dirty-side component is positioned between an underside of the floor pan and an external surface of the cover.

In a further non-limiting embodiment of any of the foregoing electrified vehicles, a threaded stud of the dirty-side component engages a threaded passage of a pipe of the clean-side component at a location inside the battery pack.

In a further non-limiting embodiment of any of the foregoing electrified vehicles, a seal is positioned between a flange of the dirty-side component and an external surface of the cover.

In a further non-limiting embodiment of any of the foregoing electrified vehicles, the seal is received within a groove formed in either the external surface of the cover or the flange of the dirty-side component.

In a further non-limiting embodiment of any of the foregoing electrified vehicles, a nut is positioned over a stud of the dirty-side component and is received against the floor pan.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details electrified vehicles that are equipped with pass through assemblies for structurally reinforcing and sealing battery packs. An exemplary pass through assembly includes a clean-side component and a dirty-side component. The clean-side component is positioned inside the battery pack, and the dirty-side component engages the clean-side component and extends to a location outside of the battery pack for interfacing with a component of the vehicle underbody. A seal of the pass through assembly is positioned between the clean-side component and the dirty-side component and is configured to block the ingress of water, dirt, and other potential contaminants. These and other features are discussed in greater detail in the following paragraphs of this detailed description.

Figure 1:
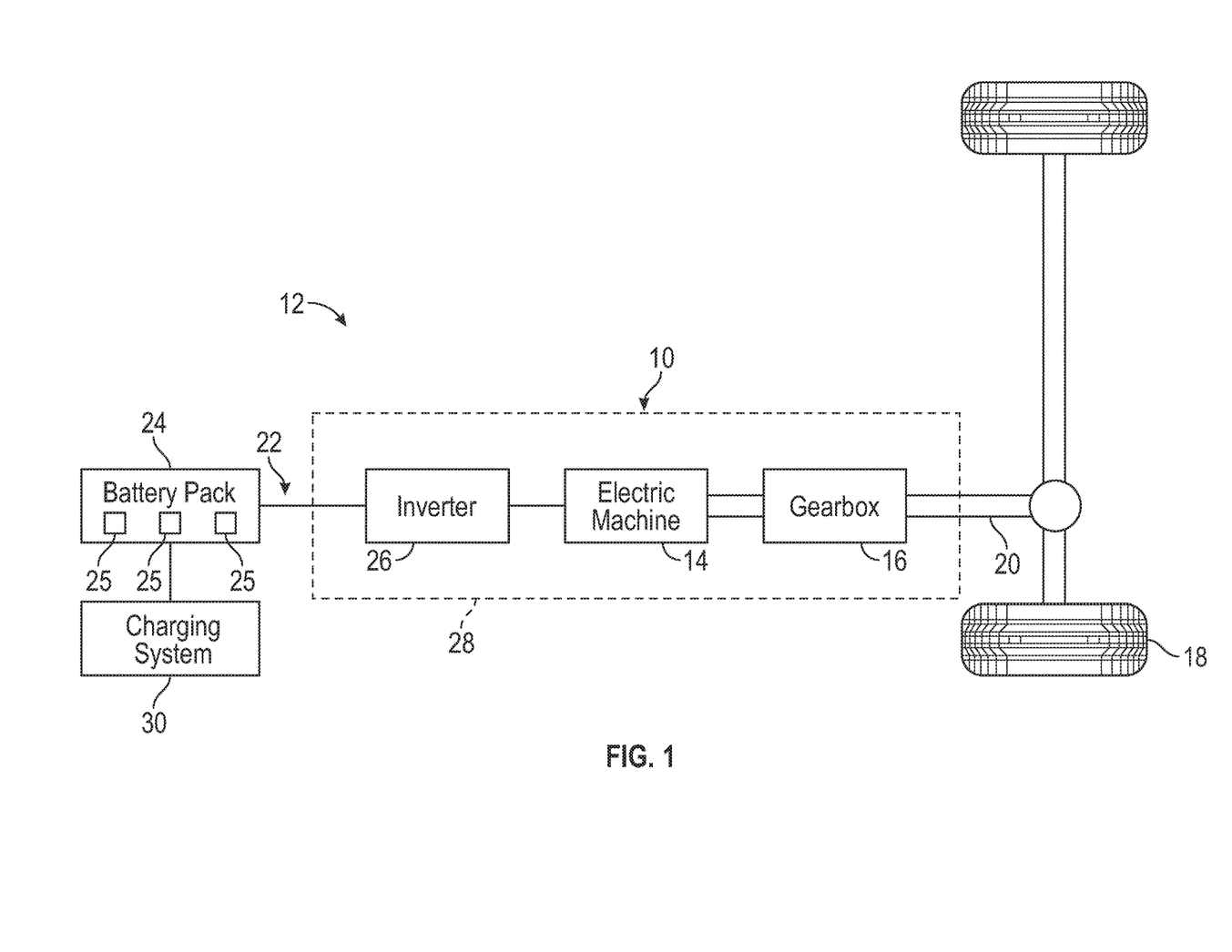
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). In another embodiment, the electrified vehicle 12 is a hybrid electric vehicle (HEV) or a plug-in hybrid electric vehicle (PHEV). Therefore, although not shown in this embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output torque. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26. The electric machine 14, the gearbox 16, and the inverter 26 may be collectively referred to as a transmission 28.

The battery pack 24 is an exemplary electrified vehicle battery. The battery pack 24 may be a high voltage traction battery pack that includes a plurality of battery arrays 25 (i.e., battery assemblies or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 is also be equipped with a charging system 30 for charging the energy storage devices (e.g., battery cells) of the battery pack 24. The charging system 30 may include charging components that are located both onboard the electrified vehicle 12 and external to the electrified vehicle 12. The charging system 30 can be connected to an external power source (e.g., a wall outlet, a charging station, etc.) for receiving and distributing power received from the external power source throughout the electrified vehicle 12.

The powertrain 10 of FIG. 1 is highly schematic and is not intended to limit this disclosure. Various additional components could alternatively or additionally be employed by the powertrain 10 within the scope of this disclosure.

Figure 2:
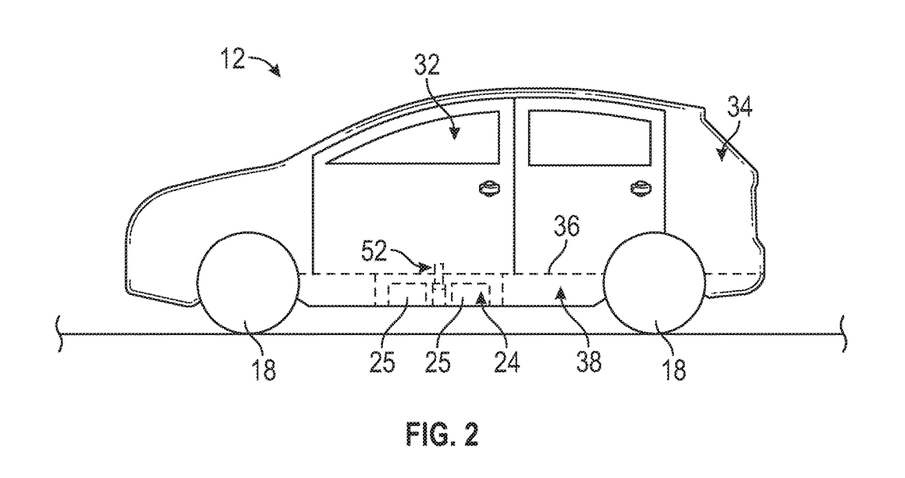
FIG. 2 illustrates an electrified vehicle that may employ the powertrain of FIG. 1.

FIG. 2 illustrates an electrified vehicle 12 that may employ the powertrain 10 of FIG. 1 or any other electrified or hybridized powertrain. In an embodiment, the electrified vehicle 12 is a car. However, the electrified vehicle 12 could be a car, a truck, a van, a sport utility vehicle, or any other vehicle type. Although a specific component relationship is illustrated in the figures of this disclosure, the illustrations are not intended to limit this disclosure. The placement and orientation of the various components of the electrified vehicle 12 are shown schematically and could vary within the scope of this disclosure. In addition, the various figures accompanying this disclosure are not necessarily to scale, and some features may be exaggerated or minimized to show certain details of a particular component.

The electrified vehicle 12 may include a passenger cabin 32 and a cargo space 34 (e.g., a trunk) located to the rear of the passenger cabin 32. A floor pan 36 separates the passenger cabin 32 from a vehicle underbody 38. The battery pack 24 may be suspended from the vehicle underbody 38 such that it is remote from both the passenger cabin 32 and the cargo space 34. The battery pack 24 therefore does not occupy space that would otherwise be available for carrying passengers or cargo. The battery pack 24 may be secured relative to the vehicle underbody 38 using any fastening method, including but not limited to bolting, strapping, welding, etc.

Figure 3:
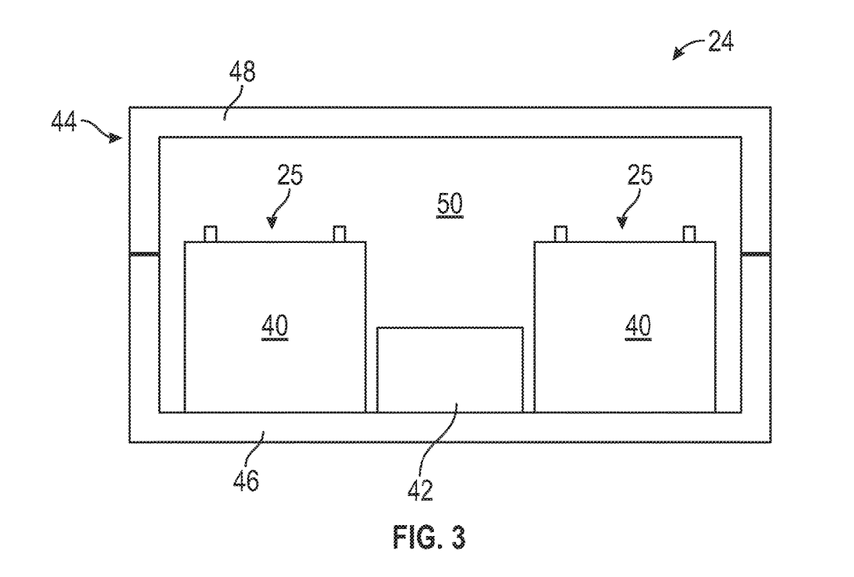
FIG. 3 illustrates an exemplary battery pack of an electrified vehicle.

Referring now to FIGS. 2 and 3, the battery pack 24 may house a plurality of battery cells 40 that store energy for powering various electrical loads of the electrified vehicle 12, such as the electric machine 14 of FIG. 1, for example. In an embodiment, the battery pack 24 houses prismatic, lithium-ion cells. However, battery cells having other geometries (cylindrical, pouch, etc.), other chemistries (nickel-metal hydride, lead-acid, etc.), or both could alternatively be utilized within the scope of this disclosure. The battery pack 24 may additionally house various other components, including but not limited to, a bussed electrical center (BEC), a battery electric control module (BECM), wiring harnesses, wiring, I/O connectors, etc.

The battery cells 40 may be grouped together in one or more battery arrays 25. In an embodiment, the battery pack 24 includes two battery arrays 25. However, the total numbers of battery cells 40 and battery arrays 25 employed within the battery pack 24 are not intended to limit this disclosure.

A battery internal structure 42, such as a relatively rigid cross member, may be positioned between the adjacent battery arrays 25. The battery internal structure 42 adds rigidity to the battery pack 24.

An enclosure assembly 44 houses each battery array 25 of the battery pack 24. In an embodiment, the enclosure assembly 44 is a sealed enclosure. The enclosure assembly 44 may include any size, shape, and configuration within the scope of this disclosure.

In an embodiment, the enclosure assembly 44 includes a tray 46 and a cover 48. The tray 46 and the cover 48 cooperate to surround and enclose the battery arrays 25. The tray 46 may provide an open area 50 for holding the battery arrays 25. After positioning the battery arrays 25 within the open area 50, the cover 48 may be seated and sealed to the tray 46 to enclose the battery arrays 25.

Portions of the enclosure assembly 44 may be made of polymer based materials. In an embodiment, the cover 48 is constructed (e.g., molded) of a solid polymer-based material. Exemplary solid polymer-based materials can include, but are not limited to, sheet moulding compounds (e.g., glass-fiber reinforced polyester), polypropylene, and polyamine. The tray 46 or the cover 48 could be made from other polymer based materials within the scope of this disclosure.

Due to the mounting location of the battery pack 24 beneath the floor pan 36 of the vehicle underbody 38, the battery pack 24 may be susceptible to noise, vibration, and harshness, and vehicle impact events. In addition, the use of polymer-based materials within the enclosure assembly 44 of the battery pack 24 may render a structure that is not stiff or strong enough for adequately mounting the battery pack 24 to the vehicle underbody 38. A novel pass through assembly 52 is therefore proposed within this disclosure. The pass through assembly 52 is configured for both structurally reinforcing the battery pack 24 and sealing a hole or opening that is formed through the enclosure assembly 44 of the battery pack 24 in order to accommodate the pass through assembly 52.

Figure 4:
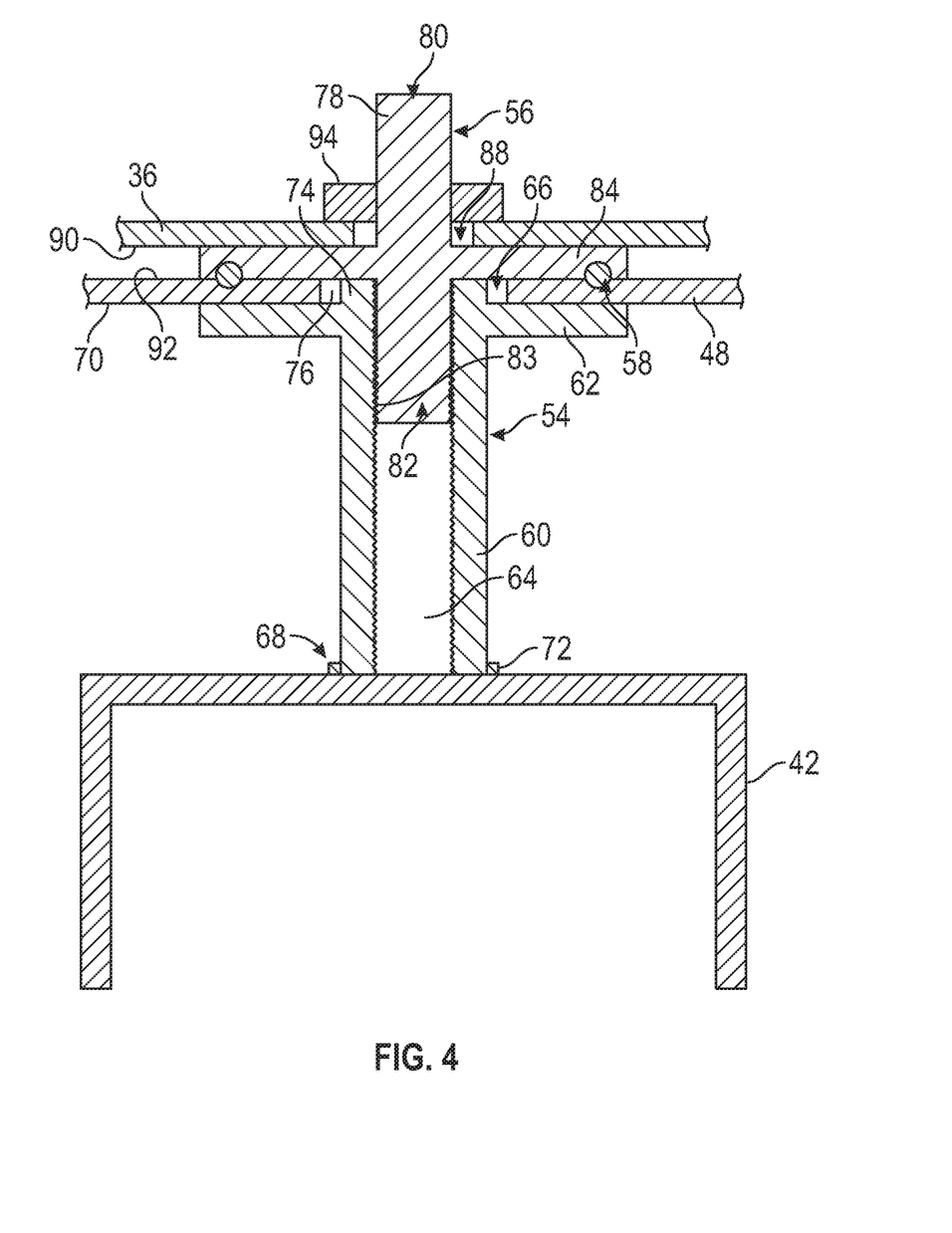
FIG. 4 illustrates an exemplary pass through assembly for structurally reinforcing and sealing a battery pack of an electrified vehicle.
Figure 5:
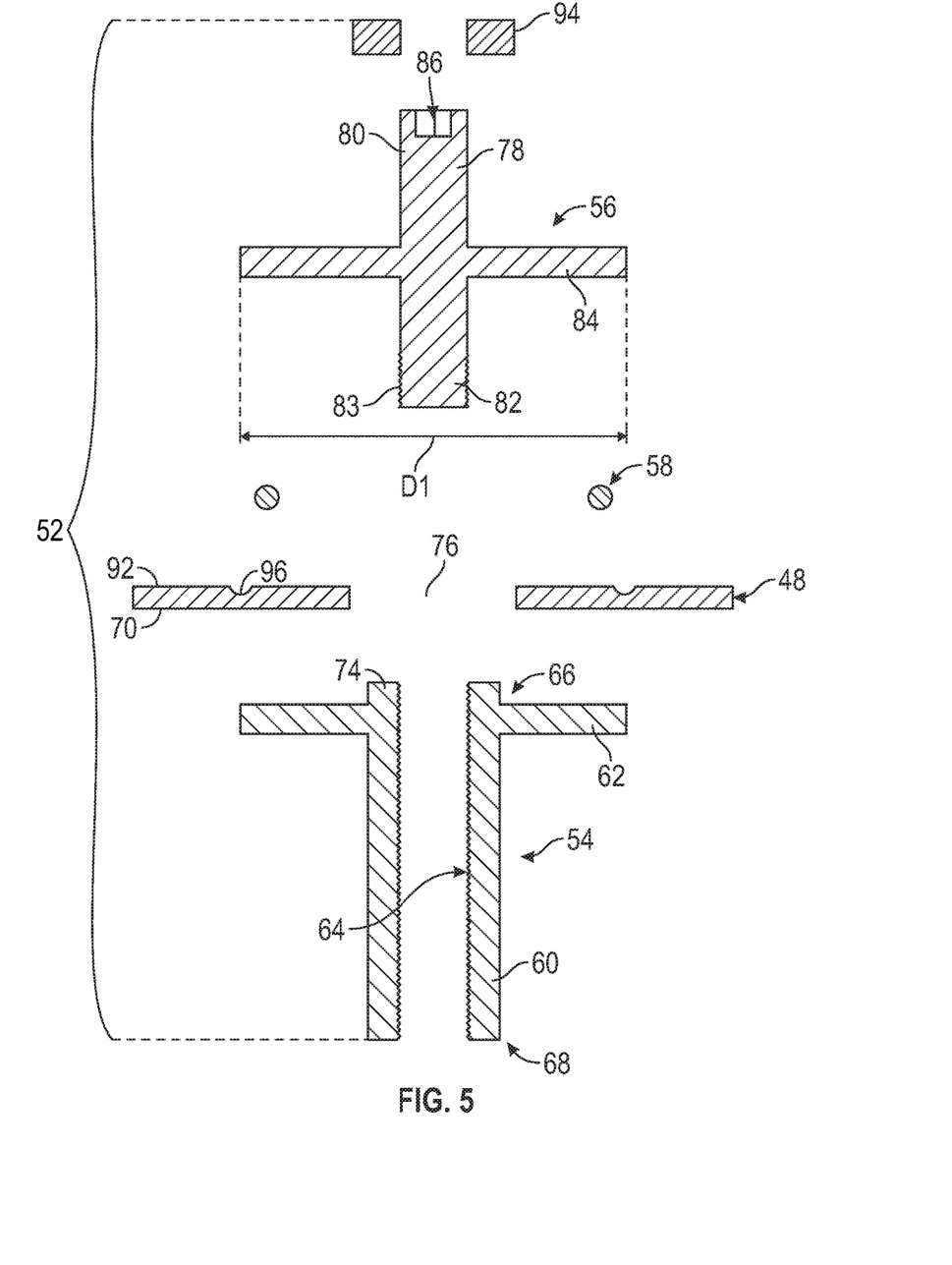
FIG. 5 is an exploded view of the pass through assembly of FIG. 4.

FIGS. 4 and 5 illustrate in further detail the exemplary pass through assembly 52. Portions of the battery pack 24 and the electrified vehicle 12 have been removed from FIGS. 4-5 to better illustrate the various features and functions of the pass through assembly 52.

The pass through assembly 52 may include a clean-side component 54, a dirty-side component 56, and a seal 58 positioned to seal a space between the clean-side component 54 and the dirty-side component 56. These components and their respective functions are described in detail below.

The clean-side component 54 is "clean" in that it is primarily located inside the battery pack 24. The clean-side component 54 may include a pipe 60 and a flange 62 that protrudes radially outwardly from the pipe 60. The pipe 60 may include a threaded passage 64 that extends from a first end 66 of the pipe 60, which is located adjacent to the flange 62, to a second end 68 of the pipe 60, which is located opposite from the first end 66. In an embodiment, the threaded passage 64 is coated with a fluoropolymer (e.g., polytetrafluoroethylene (PTFE)).

In a mounted position of the clean-side component 54, the flange 62 may abut against an inner surface 70 of the cover 48 of the battery pack 24, and the second end 68 of the pipe 60 may be secured to the battery internal structure 42 inside the battery pack 24. In an embodiment, the second end 68 of the pipe 60 is secured to the battery internal structure 42 by a weld bead 72. The weld bead 72 may be formed using a metal inert gas (MIG) welding technique, or any other welding technique, and may extend around an entire circumference of the pipe 60 at an interface between the second end 68 of the pipe 60 and the battery internal structure 42.

The clean-side component 54 may additionally include a shoulder 74 at the first end 66 of the pipe 60. In an embodiment, the shoulder 74 extends in a direction from the flange 62 toward the cover 48 of the battery pack 24. The shoulder 74 of the clean-side component 54 may be at least partially exposed and is therefore visible from within a hole 76 formed in the cover 48 of the battery pack 24. The shoulder 74 may function as a compression limiter relative to the dirty-side component 56 of the pass-through assembly 52 and generally protects the cover 48 from over-compression.

In an embodiment, the clean-side component 54 is a cold-formed component. However, the clean-side component 54 could be made from any material using any manufacturing process.

The dirty-side component 56 is "dirty" in that it is primarily located outside the battery pack 24. The dirty-side component 56 may include a stud 78 that extends between a first end 80 and a second end 82, and a flange 84 that protrudes radially outwardly from the stud 78 at a location between the first end 80 and the second end 82. The second end 82 of the stud 78 may include threads 83 that may be inserted into the threaded passage 64 of the pipe 60 of the clean-side component 54 until the flange 84 of the dirty-side component 56 abuts against the shoulder 74 of the clean-side component 54. In an embodiment, the first end 80 of the dirty-side component 56 includes a depression 86 (e.g., a drive feature) for torquing the stud 78 into the pipe 60.

Upon mounting the battery pack 24 to the electrified vehicle 12, the first end 80 of the stud 78 extends through a hole 88 formed in the floor pan 36, and the flange 84 is positioned between an underside 90 of the floor pan 36 and an external surface 92 of the cover 48 of the battery pack 24. A nut 94 may be positioned over the first end 80 of the stud 78 and screwed down against the floor pan 36 for securing the pass through assembly 52 relative to the vehicle underbody 38.

In an embodiment, the dirty-side component 56 is also a cold-formed component. However, the dirty-side component 56 could be made from any material using any manufacturing process.

Figure 6:
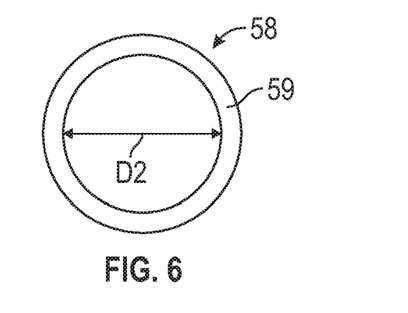
FIG. 6 illustrates a seal of the pass through assembly of FIGS. 4 and 5.

In an embodiment, the seal 58 is a self-lubricated silicone o-ring seal (see FIG. 6 for perspective view). However, other types of seals may also be suitable for sealing between the dirty-side component 56 and the clean-side component 54.

Figure 7:
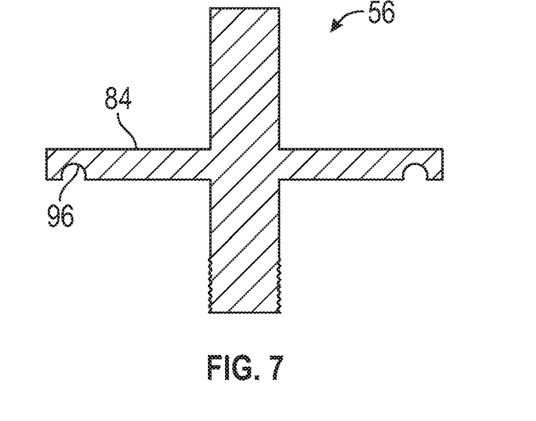
FIG. 7 illustrates a groove formed on a dirty-side component of the pass through assembly of FIGS. 4 and 5.

The seal 58 may include an annular body 59 that may be seated within a groove 96 formed in the external surface 92 of the cover 48. Alternatively, the groove 96 could be formed in the flange 84 of the dirty-side component 56 (see FIG. 7). In either embodiment, the groove 96 is generally concentric with the hole 76 formed in the cover 48. The seal 58 prevents the ingress of water, dirt, or other unwanted debris from entering into the battery pack 24 through the hole 76. In another embodiment, a diameter D1 of the flange 84 of the dirty-side component 56 is larger than a diameter D2 of the seal 58 (see FIGS. 5 and 6).

Figure 8:
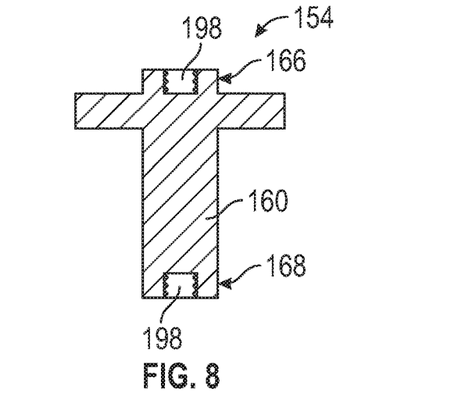
FIG. 8 illustrates an exemplary clean-side component of a pass through assembly.

FIG. 8 illustrates another exemplary clean-side component 154 of a pass through assembly. In this embodiment, instead of a threaded passage that extends completely through the pipe, the clean-side component 154 may include a pipe 160 having threaded openings 198 formed in each of a first end 166 and a second end 168 of the pipe 160. Thus, in this embodiment, the pipe 160 is a solid cylinder rather than a hollow cylinder.

Figure 9:
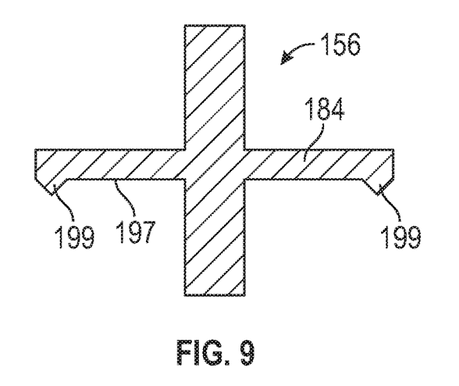
FIG. 9 illustrates an exemplary dirty-side component of a pass through assembly.

FIG. 9 illustrates another exemplary dirty-side component 156 of a pass through assembly. In this embodiment, rather than using a separate seal, a flange 184 of the dirty-side component 156 may include an inverted flange 199 that establishes the seal of pass through assembly. The inverted flange 199 protrudes from a bottom face 197 of the flange 184, and when the dirty-side component 156 is mounted to a clean-side component, the flange 184 faces the external surface 92 of the cover 48 of the battery pack 24. Once the pass through assembly is assembled and positioned relative to the battery pack 24 and the vehicle underbody 38, the inverted flange 199 may locally compress against the cover 48 to block the ingress of water, dirt, or other unwanted debris from entering into the battery pack 24.

Figure 10:
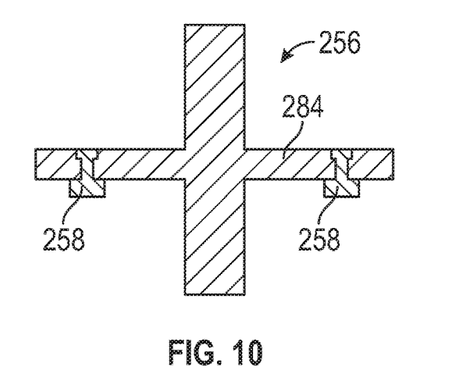
FIG. 10 illustrates another exemplary dirty-side component of a pass through assembly.
Figure 11:
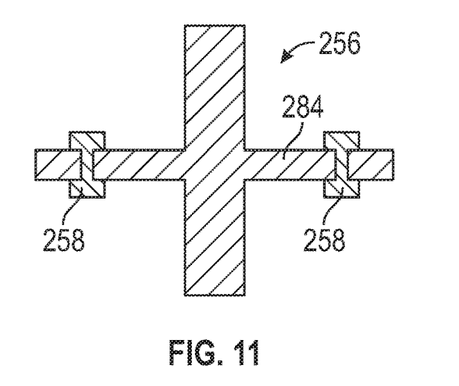
FIG. 11 illustrates yet another exemplary dirty-side component of a pass through assembly.

FIGS. 10 and 11 illustrate additional dirty-side components 256 for a pass through assembly. In these embodiments, seals 258 may be molded or otherwise embedded within a flange 284 of the dirty-side component 256. The seals 258 may be either single sided (see FIG. 10) for sealing against the cover 48 of the battery pack 24 or double sided (see FIG. 11) for sealing against both the cover 48 of the battery pack 24 and the floor pan 36 of the vehicle underbody 38.

The pass through assemblies of this disclosure provide simple, cost effective solutions for structurally reinforcing battery packs and for sealing any holes formed in the battery packs in order to accommodate the clean-side components of the pass through assemblies. The components used within the pass through assemblies are relatively low cost and easy to manufacture, thereby facilitating a simple and elegant pass through solution.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A pass through assembly for a battery pack, comprising:
   a clean-side component including a pipe and a first flange protruding from the pipe;
   a dirty-side component including a stud and a second flange protruding from the stud, wherein the stud engages a first portion of the pipe and the second flange contacts a second portion of the pipe; and
   a seal arranged between the clean-side component and the dirty-side component.

2. The pass through assembly as recited in claim 1, wherein the pipe extends between a first end and a second end, and the first flange is located nearer to the first end.

3. The pass through assembly as recited in claim 1, wherein the clean-side component includes a shoulder that extends above the first flange.

4. The pass through assembly as recited in claim 1, wherein the pipe includes a threaded passage, and a thread of the stud engages the threaded passage.

5. The pass through assembly as recited in claim 1, wherein the stud includes a drive feature adapted for torquing the stud into the pipe.

6. The pass through assembly as recited in claim 1, wherein the seal includes an annular body received within a groove formed in either a cover of the battery pack or the second flange.

7. A pass through assembly for a battery pack, comprising:
   a clean-side component including a pipe and a first flange protruding from the pipe;
   a dirty-side component including a stud and a second flange protruding from the stud, wherein the stud engages a portion of the pipe; and
   a seal arranged between the clean-side component and the dirty-side component,
   wherein the clean-side component includes a shoulder that extends above the first flange,
   wherein the second flange of the dirty-side component abuts against the shoulder.

8. A pass through assembly for a battery pack, comprising:
   a clean-side component including a pipe and a first flange protruding from the pipe;
   a dirty-side component including a stud and a second flange protruding from the stud, wherein the stud engages a portion of the pipe; and
   a seal arranged between the clean-side component and the dirty-side component,
   wherein the seal is established by an inverted flange that protrudes from a bottom face of the second flange.

9. A pass through assembly for a battery pack, comprising:
   a clean-side component including a pipe and a first flange protruding from the pipe;
   a dirty-side component including a stud and a second flange protruding from the stud, wherein the stud engages a portion of the pipe; and
   a seal arranged between the clean-side component and the dirty-side component,
   wherein the seal is embedded within the second flange and is either single sided for sealing against one structure or double sided for sealing against two structures.

10. A pass through assembly for a battery pack, comprising:
    a clean-side component including a pipe and a first flange protruding from the pipe;
    a dirty-side component including a stud and a second flange protruding from the stud, wherein the stud engages a portion of the pipe; and
    a seal arranged between the clean-side component and the dirty-side component,
    wherein a first section of the stud that extends below the second flange engages the portion of the pipe, and comprising a nut received over a second section of the stud that extends above the second flange.

11. An electrified vehicle, comprising:
a vehicle underbody including a floor pan;
a battery pack mounted beneath the floor pan;
a pass through assembly including a clean-side component and a dirty-side component;
the clean-side component extending from a location inside the battery pack and including a portion at least partially exposed within a first hole formed in a cover of the battery pack; and
the dirty-side component connected to the clean-side component and extending through a second hole formed in the floor pan.

12. The electrified vehicle as recited in claim 11, wherein a pipe of the clean-side component is secured to a battery internal structure by a weld bead.

13. The electrified vehicle as recited in claim 12, wherein the battery internal structure is a cross member positioned between a first battery array and a second battery array of the battery pack.

14. The electrified vehicle as recited in claim 11, wherein a flange of the clean-side component is received against an inner surface of the cover.

15. The electrified vehicle as recited in claim 11, wherein a shoulder of the clean-side component is the portion exposed within the first hole, and the shoulder abuts against a flange of the dirty-side component.

16. The electrified vehicle as recited in claim 11, wherein a flange of the dirty-side component is positioned between an underside of the floor pan and an external surface of the cover.

17. The electrified vehicle as recited in claim 16, wherein a threaded stud of the dirty-side component engages a threaded passage of a pipe of the clean-side component at a location inside the battery pack.

18. The electrified vehicle as recited in claim 11, comprising a seal positioned between a flange of the dirty-side component and an external surface of the cover.

19. The electrified vehicle as recited in claim 18, wherein the seal is received within a groove formed in either the external surface of the cover or the flange of the dirty-side component.

20. The electrified vehicle as recited in claim 11, comprising a nut positioned over a stud of the dirty-side component and received against the floor pan.

* * * * *